United States Patent [19]

Kelgard

[11] Patent Number: 4,742,801
[45] Date of Patent: May 10, 1988

[54] DUAL FUEL MOBIL ENGINE SYSTEM

[76] Inventor: Erik Kelgard, 322-8880 No. 1 Road, Richmond, B.C., Canada, V7C 4C3

[21] Appl. No.: 85,640

[22] Filed: Aug. 13, 1987

[51] Int. Cl.⁴ .............................................. F02B 3/00
[52] U.S. Cl. .............................. 123/27 GE; 123/557; 123/526
[58] Field of Search ................... 123/27 GE, 526, 525, 123/557

[56] References Cited

U.S. PATENT DOCUMENTS

| | | | |
|---|---|---|---|
| 2,724,372 | 11/1955 | Schowalter | 123/27 GE |
| 4,091,772 | 5/1978 | Heater et al. | 123/27 GE |
| 4,527,516 | 7/1985 | Foster | 123/27 GE |
| 4,679,538 | 7/1987 | Foster | 123/27 GE |

FOREIGN PATENT DOCUMENTS 1370619 10/1974 United Kingdom .......... 123/27 GE

Primary Examiner—E. Rollins Cross
Attorney, Agent, or Firm—Kinzer,Plyer,Dorn,McEachran & Jambor

[57] ABSTRACT

This is a dual fuel engine, meaning an engine that is operated with straight diesel fuel or with gaseous fuel and pilot injection of diesel fuel, the invention is primarily concerned with dual fuel engines for use in over-the-road vehicles but it has other applications. The invention also contemplates using the heat from the cooling water of the jackets of the engine to vaporize a liquid fuel into a gaseous state which is thereafter injected directly into the cylinders of the engine during operation on the dual fuel cycle.

5 Claims, 1 Drawing Sheet

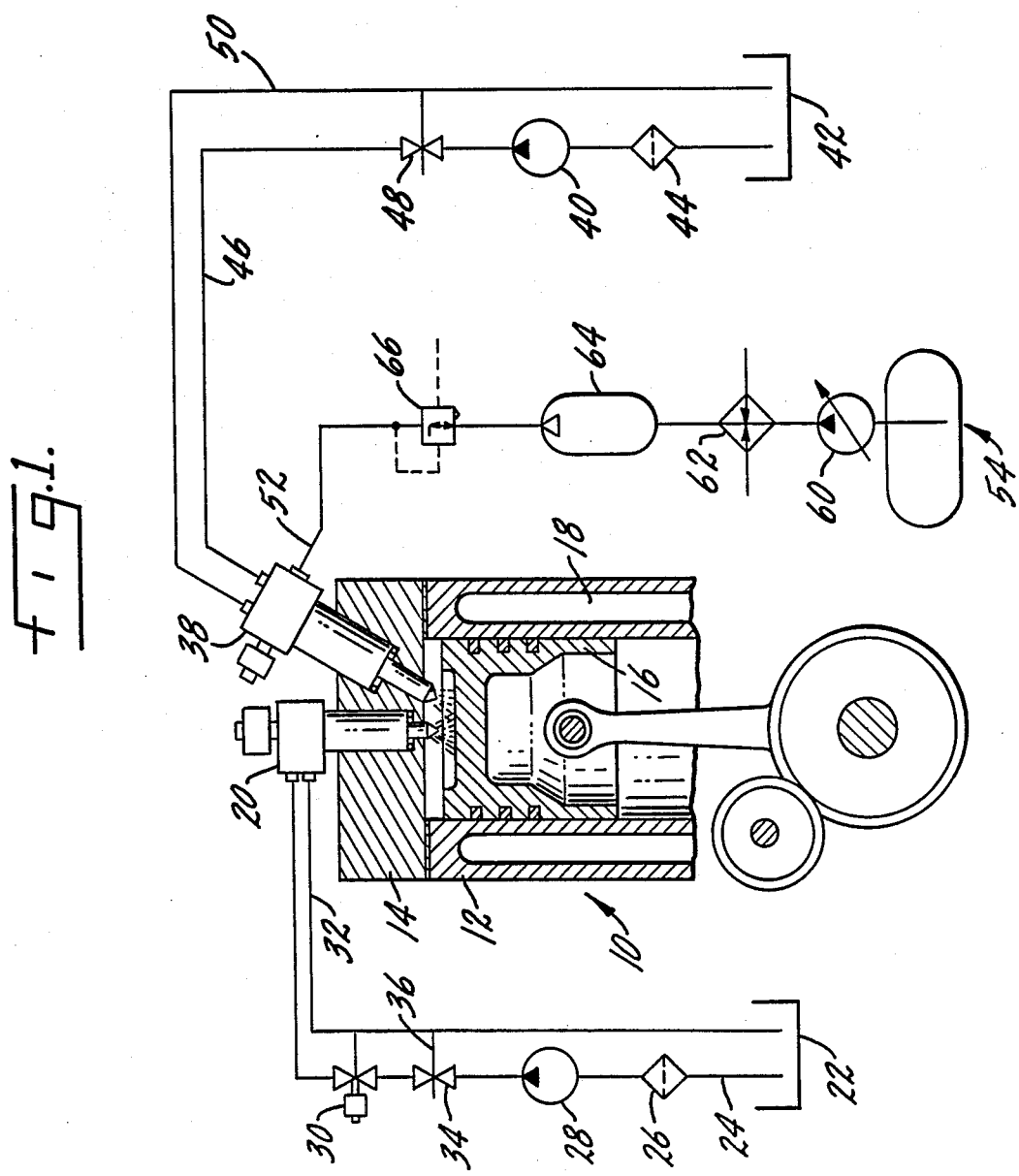

DUAL FUEL MOBIL ENGINE SYSTEM

SUMMARY OF THE INVENTION

This invention is concerned with a so-called dual fuel engine and is broadly in the field of internal combustion engines and specifically is in the nature of a dual fuel engine and a method or way of operating such an engine. By dual fuel engine is meant an engine that is constructed and arranged to operate on the diesel cycle with diesel fuel only being injected into the cylinders of the engine and also on the Otto cycle with gaseous fuel being supplied and ignited by a small quantity of so-called pilot oil. Such an engine is referred to conventionally as a dual fuel engine and is a well known type. I shall refer to the cycle of the engine when operating on diesel fuel alone as the diesel cycle, and the cycle when operating on gaseous fuel with pilot fuel injection as the dual fuel cycle.

A primary object of the invention is a system or method of operating a dual fuel engine in a manner that is particularly advantageous for use on over-the-road variable speed vehicles.

Another object of the invention is a dual fuel engine for an over-the-road vehicle which uses or has a source of liquified gas, such as liquified natural gas, liquified petroleum gas or possibly methanol.

Another object is a dual fuel engine system which vaporizes the liquified gas in a simple, convenient way without a external source of heat.

Another object is a dual fuel engine of the above type which uses gaseous fuel injection.

Another object is a dual fuel engine system of the above type which avoids knock problems.

Other objects will appear from time to time in the ensuing specification and drawings.

BRIEF DESCRIPTION OF THE DRAWINGS

FIG. 1 is a schematic of a dual fuel engine with alternate gaseous fuel systems; and FIG. 2 is an alternate form.

BRIEF DESCRIPTION OF THE PREFERRED EMBODIMENT

In the drawings, the cross section of an engine cylinder is indicated generally at 10 which includes the usual cylinder 12, cylinder head 14, piston 16, connecting rod, crankshaft, etc. The engine is of the water cooled type and the jackets therefor are indicated at 18.

The cylinder head has a conventional diesel injector 20 which has a conventional fuel supply 22 with a supply line 24 leading through a conventional filter 26 followed by any suitable pump 28 and pressure regulator 30. The return line 32 leads back to the sump with a relief valve 34 in the supply line connected thereto as at 36, all of which is conventional.

A gaseous fuel injector 38 is also positioned in the cylinder head in a suitable manner, as explained later, and is actuated by a pump 40 which draws oil from a tank or supply 42 through a filter 44 in a supply line 46 with a relief valve 48 returning oil to a return line 50. The pump 40 actuates the gas injector 38 with gas being supplied thereto through a connection 52. The gas injection valve may also be operated by an electric solenoid.

Alternate gas supply systems are shown, the first 54 in FIG. 1 being a liquified natural gas system, and the second 56 in FIG. 2 being a liquified petroleum gas system.

Considering the first in FIG. 1, a tank or source of liquified natural gas supplies liquid fuel to a high pressure liquified natural gas pump 60. The positive displacement pump is capable of pressures up to, for example, on the order of 3000 psi which transfers the liquified natural gas to an evaporator or heat exchanger 62 where the liquified gas changes state from liquid to gas. The gaseous fuel is then supplied to a surge tank 64 which insures immediate response for increase in load while maintaining a pressure equal to the full load requirements of the engine. The gaseous fuel next flows through a pressure regulator 66 where the supply pressures to the injector may be modulated to suit the engine load and speed.

As an alternate in FIG. 2, the unit may have a liquified petroleum gas tank, indicated at 56 which is connected to a low pressure pump 68, also a positive displacement pump which may create on the order of 300 psi as an example. The pump supplies the liquid fuel to an evaporator or heat exchanger 70 which changes the liquid to a gas. The gas then goes to an engine driven compressor 72 where the pressure will be raised to the required injection pressure. Again a surge tank 74 and pressure regulator 76 may be used.

In the case of liquified natural gas and liquified petroleum gas the heat exchangers 62 and 70 are important and add heat to the liquified fuel which changes its state into a gas. In an over-the-road vehicle a convenient source of heat is the jacket water which is normally rejected to the atmosphere by a radiator. Suitable connections would be supplied, not shown, to bring the hot water from the jackets 18 to the heat exchanger 62 in the case of liquified natural gas or the heat exchanger 70 in the case of liquified petroleum gas. The result is that a very convenient source of heat is readily available and no outside source is required.

The use operation and function of the invention are as follows.

The diesel engine's thermal efficiency is a function of the engine's compression ratio. A high compression ratio also means a high temperature ratio This fact is of importance when a diesel engine is to be operated as a dual fuel engine, that is where the majority of the fuel used in the engine is natural gas or other petroleum gas with a small percentage of diesel fuel used as pilot oil ignition.

The autoignition temperatue of a natural gas/air mixture varies with the ratio of the mixture. The leaner the mixture is, the more air there is per unit volume of fuel, the higher the temperature needs to be to initiate reaction. The limit to this method of autoignition control is the lower flamability of the gas used for fuel. For methane this is 5% by volume in air.

For carbueretted dual fuel engines where the air and fuel is blended into a more or less homogenous mixture, either in the intake manifold or in the cylinder on the intake stroke a high compression temperature may lead to problems with detonation commonly known as knock. This may come about because the attained mixture is in fact not homogenous and therefore have strata of high fuel concentration, or because the amount of air in the cylinder is insufficient for the amount of fuel introduced. In either case destructive detonation will occur until either the engine load is cut back or the mixture preparation has been remedied.

To permit the benefits of a high compression ratio to be retained by an engine to be operated with gaseous fuel the detonation problem and loss of load carrying capacity can be overcome by injecting the fuel directly into the cylinder at or about the end of the compression stroke. The injection should be timed having due regard to the ignition lag of the diesel fuel so that combustion of the gaseous fuel takes place as the fuel is injected at a controlled rate to avoid injurious high peak pressures due to overfuelling.

The engine, to operate as a direct injection unit, needs two injectors, one for gas and one for diesel fuel. If the engine has to retain its full load carrying capacity on diesel fuel the diesel injector must retain this capacity. If, on the other hand, a sufficiently reliable source of gaseous fuel is available this injector can be sized to permit starting and warm-up only. This has the advantage that the turndown to low pilot oil quantities is more easily attained.

The location in the cylinder head of the two injectors should be as close to one another as possible. The ideal solution, not illustrated here, would be to have the two injectors combined in a single body but each retaining their own separate operating functions with the spray holes in the nozzle protruding into the combustion chamber stacked one above the other for the two fuels.

Where this ideal solution cannot be applied for whatever reason two separate injectors should be so oriented that the gas plume will surround the spray tip of the pilot oil injector. With proper control of the exit velocities from the two injectors the fuel will be concentrated around the pilot injector tip in the manner of a stratified charge engine. This means that the fuel/air ratio in the center of the concentration will be close to stoichiometric surrounded by increasingly lean mixtures until only pure air is found at the periphery.

The necessary equipment to achieve this objective is shown on the drawing. For use with liquified natural gas (LNG) a positive displacement pump capable of pressures up to 3000 psi is desirable to transfer the liquified gas into an evaporator where a change-of-state from liquid to gas will take place using energy from the jacket water. The vapor pressure of saturated methane vapor at 50° F. is about 3000 psi. To comply with the requirements for variable speed operation and stratified charge combustion the gas and pilot oil pressure will be varied to maintain the required exit velocity from the injectors. To ensure immediate response for increase in load a surge tank is inserted to maintain a pressure equal to the full load requirements.

If the engine is to be operated with liquified petroleum gas (LPG) a low pressure positive displacement pump (300 psi) is also used to pump the liquid fuel into an evaporator which also will use jacket water to change the liquid to gas. From the evaporator the gas will go to an engine driven compressor where the pressure will be raised to the required injection pressure. The use of the evaporator fixes the suction pressure to the compressor and reduces the compression ratio required to 10:1.

One of the major advantages of the above system is in an over-the-road diesel propelled vehicle where the jacket water can be used to supply heat to the heat exchangers. The invention however is not limited to a vehicular engine but would have certain advantages in a fixed installation engine such as for power generation, pipeline pumping, etc. But it is believed that its main advantage's will be acquired in mobile or over-the-road units. While I have referred to the use of a heat exchanger using jacket water for heat as the means for raising pressure, in certain installations it might be done by other means, such as a compressor.

While the preferred form and several variations of the invention have been shown, described, and suggested, it should be understood that suitable additional modifications, changes, substitutions and alterations may be made without departing from the invention's fundamental theme.

The embodiments of the invention in which an exclusive or privilege is claimed are defined as follows:

1. In a dual fuel engine constructed to operate on the diesel cycle with diesel fuel only or on gaseous fuel with pilot fuel injection, a cylinder and piston, a diesel fuel injector in the cylinder and a pump therefore for supplying full diesel fuel injection when operating on the diesel cycle or only pilot fuel when operating on the dual fuel cycle, a gaseous fuel injector in the cylinder and a hydraulic actuator therefor for injecting gaseous fuel under pressure into the cylinder during the dual fuel cycle, a source of gaseous fuel in liquid form, a supply line from the liquid fuel source to the gaseous fuel injector, and a heat exchanger in the supply line for changing the liquid fuel from the source to a gas before it is supplied to the gaseous fuel injector.

2. The structure of claim 1 further characterized in that the cylinder is cooled by a jacket water cooling system, and further including means to supply the pilot water to the heat exchangers so that the heat from the jacket water changes the liquid fuel to a gas.

3. The structure of claim 1 further characterized by and including a surge tank in the supply line between the liquid fuel source and the gaseous fuel injector to insure immediate gaseous fuel response for increases in load on the engine.

4. The structure of claim 1 further characterized in that the source of gaseous fuel in liquid form is a liquified natural gas.

5. The structure of claim 1 further characterized in that the source of gaseous fuel in liquid form is a liquified petroleum gas and further including a compressor between the heat exchanger and the gaseous fuel injector to raise the pressure of the thus gasified fuel to the required injection pressure.

* * * * *